(12) United States Patent
Donald, II et al.

(10) Patent No.: US 7,188,491 B2
(45) Date of Patent: Mar. 13, 2007

(54) RECREATIONAL STORAGE AND MULTIMEDIA APPARATUS

(76) Inventors: Gerard W. Donald, II, 1443 Brightside Dr., Apartment No.128, Baton Rouge, LA (US) 70820; Glen A. Donald, 1443 Brightside Dr., Apartment No. 128, Baton Rouge, LA (US) 70820

( * ) Notice: Subject to any disclaimer, the term of this patent is extended or adjusted under 35 U.S.C. 154(b) by 131 days.

(21) Appl. No.: 10/447,813

(22) Filed: May 29, 2003

(65) Prior Publication Data
US 2004/0237574 A1    Dec. 2, 2004

(51) Int. Cl.
*F25D 3/08*    (2006.01)

(52) U.S. Cl. .......................... 62/457.7; 62/371

(58) Field of Classification Search .............. 62/457.1, 62/457.7, 331, 371; 455/351, 344
See application file for complete search history.

(56) References Cited

U.S. PATENT DOCUMENTS 4,213,309 A * 7/1980 Pifer .......................... 62/332

| 4,279,342 A | 7/1981 | Van Pelt |
| 4,571,740 A | 2/1986 | Kirby et al. |
| 4,841,661 A * | 6/1989 | Moore .......................... 43/54.1 |
| 5,235,822 A | 8/1993 | Leonovich, Jr. |
| 5,257,509 A * | 11/1993 | Harris .......................... 62/326 |
| 5,295,369 A * | 3/1994 | Garcia .......................... 62/389 |
| D351,319 S | 10/1994 | Long et al. |
| 5,781,853 A * | 7/1998 | Johnson ...................... 455/351 |
| D414,987 S | 10/1999 | Moffett, III et al. |
| 5,979,175 A * | 11/1999 | Ellison ...................... 62/457.7 |
| D441,738 S | 5/2001 | Schuiling |
| D442,438 S | 5/2001 | Schankowski |
| 6,305,185 B1 | 10/2001 | Sloan |

* cited by examiner

*Primary Examiner*—Melvin Jones
(74) *Attorney, Agent, or Firm*—Keaty Professional Law Corporation

(57) ABSTRACT

A portable recreational container provides insulated storage for food and beverages. The container is divided into independent compartments, one of which houses a battery and a number of audio/video devices, such as radio, CD, DVD, TV and an amplifier. The electric/electronic devices are isolated from the food compartment by a separating wall and cover(s) mounted over the electric/electronic devices.

19 Claims, 1 Drawing Sheet

RECREATIONAL STORAGE AND MULTIMEDIA APPARATUS

BACKGROUND OF THE INVENTION

The present invention relates to portable storage containers, and more particularly, to a storage container for use in a recreational environment. Even more particularly, the present invention relates to a storage container that can be adapted for storing cold food products, while also providing a multimedia entertainment system, all enclosed in a single structure.

A large number of people pursue various kinds of recreational activities. Some prefer mountain hiking, some prefer beach locations, and others enjoy the woods. Some people, due to their work-related activities, such as for instance construction workers, prefer to bring their lunches and beverages to a constructions site. Majority of people taking lunch food with them for recreational or work activities, also prefer to have a radio or a cassette player available at the site where the portable cooler is used. To that end, people bring their ice chests, radios, cassette players, CD players and other items, making transportation of separate items inconvenient and bulky.

The present invention contemplates elimination of drawbacks associated with the prior art and provision of a combined ice chest and multi-media container for use outdoors, where municipal electrical supply is unavailable.

SUMMARY OF THE INVENTION

It is, therefore, an object of the present invention to provide a cooling storage container and a multimedia unit, all combined in one structure.

It is another object of the present invention to provide a combined ice chest and entertainment unit that is portable and can be easily transported by one person.

It is a further object of the present invention to provide a combined ice chest and multimedia apparatus that has separate but related compartments for food and electronic components.

These and other objects of the present invention are achieved through a provision of an insulated container that houses audio and video devices in an interior media compartment and receives various beverage and food items in an interior food compartment. A separating wall extending upwardly to the top of the container divides the interior chamber into two independent compartments. In one or both embodiments of the present invention the lid has an inner raised rib extending across the width thereof. A receiving groove is formed in the top surface of the separating wall to accommodate the raised rib and facilitate isolation of the electric/electronic devices mounted in the media compartment from the moisture and food items positioned in the food compartment.

The electric/electronic devices may include a radio, a compact disc player, a digital video player, an MP3 player, an amplifier and a television device. The television device is fitted into the interior portion of the hinged lid; the TV device is further protected by a cover fitted over the TV unit in the lid.

The front wall of the container carries one or more speakers connected to the audio devices. A battery is positioned in the media compartment for powering the electric/electronic devices. The battery may be re-charged by a 12V or AC power source.

BRIEF DESCRIPTION OF THE DRAWINGS

Reference will now be made to the drawings, wherein like parts are designated by like numerals and wherein.

DETAILED DESCRIPTION OF THE PREFERRED EMBODIMENT

Figure 1:
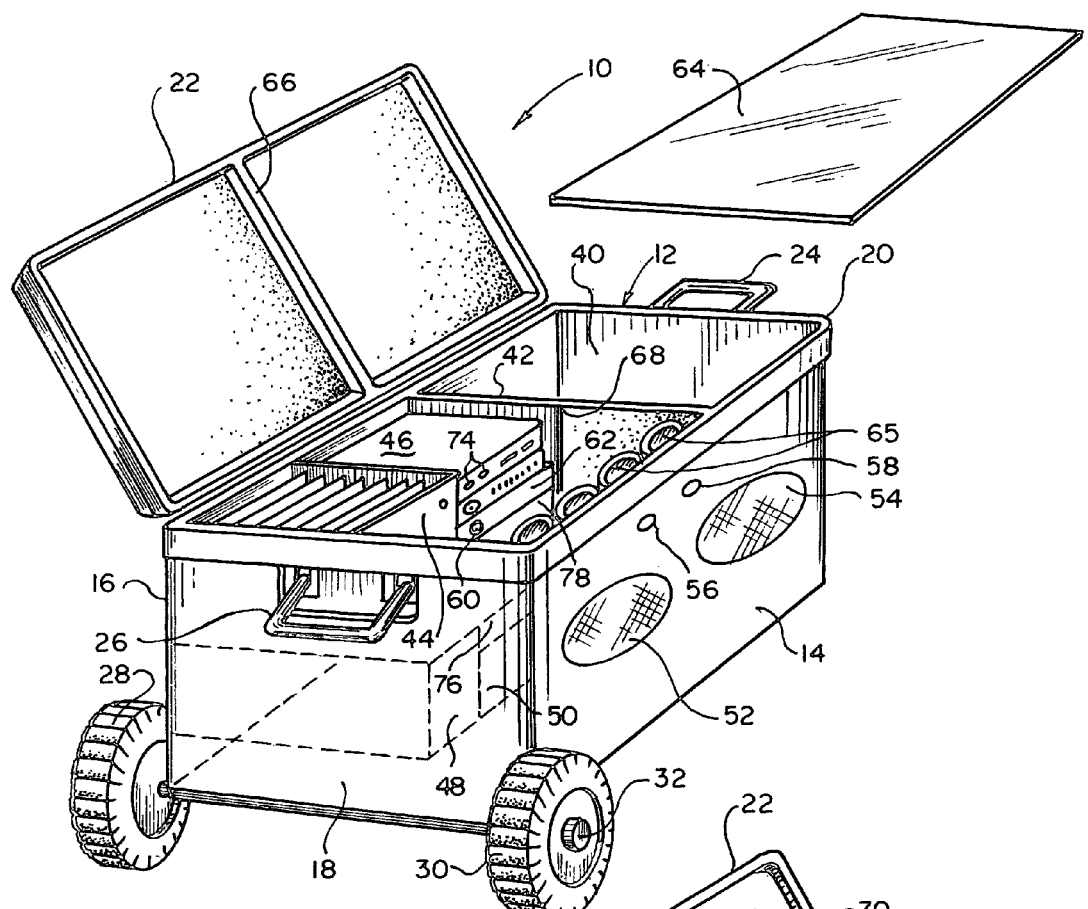
FIG. 1 is a perspective view of the recreational storage and the multimedia apparatus in accordance with the present invention.

Turning now to the drawings in more detail, the recreational storage container of the present invention is generally designated by numeral 10. As can be seen in the drawing, the apparatus of the present invention comprises an insulated container 12 that has upright walls. The upright walls include a front wall 14, a rear wall 16, a left wall 18, a right wall 20. A hinged lid 22 is attached to the top of the rear wall 16. The lid 22 is adapted for moving between an open position shown in FIG. 1 and a closed position, closing the container 12. Each of the walls and the lid 22 is made from conventional insulating material, for instance insulating plastic, aluminum and the like.

A pivotal handle 24 and 26 is mounted on each of the left and the right walls 20 and 18, respectively. If desired, a single pull handle 27 (FIG. 2) may be used in lieu of the pulling handles 24, 26. The handles 24, 26 or 27 pivot about their respective shafts (not shown) to facilitate convenient transportation of the container 12 to the recreational site.

The left side of the container 12 is supported on rotating wheels 28 and 30, which are rotated about a shaft 32. When wheeling the container 12 to the desired location, the user grabs the handle 24, lifting the right end of the container off the ground and pulls the container 12 with the assistance of the wheels 28 and 30.

Figure 2:
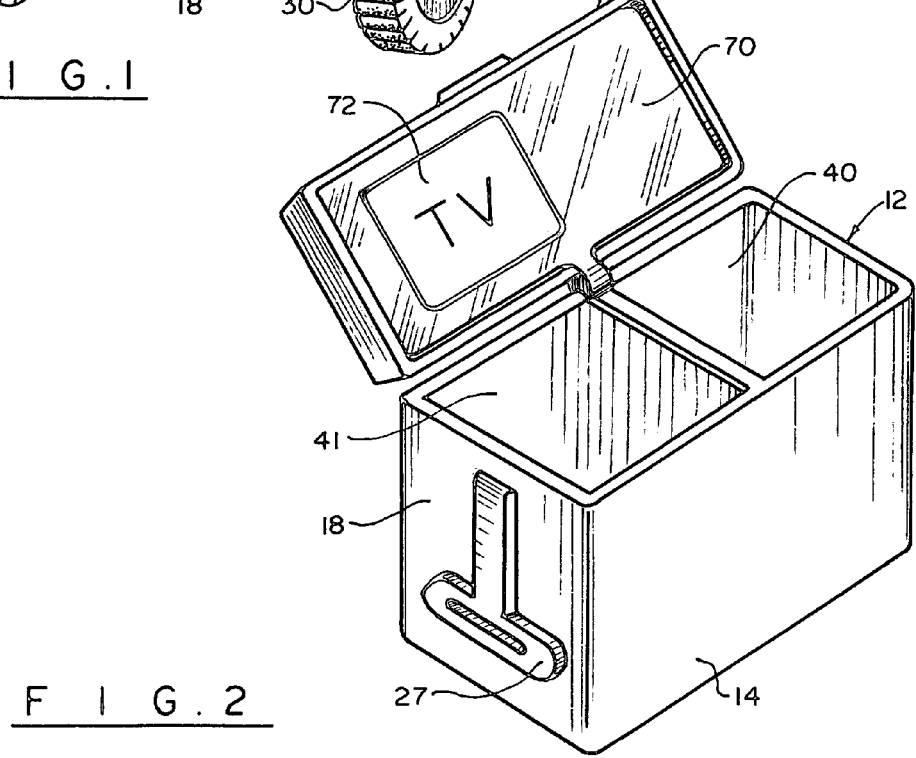
FIG. 2 is a perspective view of the second embodiment of the present invention, where one of the entertainment units is a television fitted into the lid of the ice chest structure.

The interior chamber of the container 12 is divided into two main interior compartments—a food compartment 40 and a media compartment 41 (FIG. 2). The food compartment 40 occupies the right side of the container chamber. The chamber 40 is free from obstructions and extends from the top of the container 12 to the bottom thereof. A separation wall 42 divides the container inner chamber roughly in half, protecting the electronic devices, while ensuring that the food items positioned in the compartment 40 do not shift into the media compartment 41 housing the audio/video devices. A variety of electric/electronic devices may be positioned in the media compartment 41, including an amplifier 44, a CD player 46, a CD/DVD 48, and a portable power source, such as battery 50.

The placement of the battery 50 in the bottom portion of the compartment 41 of the container 12 allows balancing of the container 12 and facilitates its towing by the consumer. The battery 50 may be re-charged in a number of ways. To this end, a plug receptacle 60 is provided on a control panel 62. The receptacle 60 is adapted to receive a plug (not shown) of a DC adapter or a 12-volt battery connectable to a vehicle, boat, and the like.

A pair of speakers 52 and 54 is built into the front wall 14. The speakers 52 and 54 are electrically operationally connected to the audio devices located in the compartment 41. A pair of smaller speakers 56 and 58 is built into the front wall 14 above the larger speakers 52 and 54. The combination of speakers 52, 54, 56 and 58 provides sufficient audio output for even the most noisy of environments.

A plurality of sleeves 65 is secured in the inner front wall 14. The sleeves 65 are adapted for receiving miscellaneous items therein, such as extra tapes, CDs, DVDs, etc. The sleeves 65 can be one or more in number, depending on the manufacturing preferences.

A waterproof cover 64 is provided for positioning over the compartment 41 of the container 12, which houses electrical and electronic devices. The cover 64 effectively isolates the left side of the container 12 and prevents any moisture or food particles from falling into the media compartment and damaging the electronic equipment.

To further facilitate the separation of the two halves of the container 12, the lid 22 is provided with a raised separation rib 66, which extends across the width of the lid 22. The rib 66 fits into a groove 68 formed in the top of the separation wall 42, allowing to seal off the media compartment 41.

FIG. 2 illustrates the recreational container of the present invention with an optional television unit built into the container 12. As shown in FIG. 2, a flat screen T.V. 72 is fitted into the inner portion of the lid 22. The TV unit 72 is protected by a clear plastic cover 70, which is also fitted into the lid 22. The T.V. screen 72 occupies the left side of the lid 22, and will be protected from damage and scratches during transportation by the protective cover 70. The hinged lid, in its open position may be manipulated to extend at an angle most convenient for watching the television. It will be understood that other electric/electronic entertainment devices, although not shown in FIG. 2, may be positioned in the compartment 41. Similarly, speakers, battery, etc. may be provided in the container shown in FIG. 2, similarly to the embodiment shown in FIG. 1.

The CD player 46 can be CD/DVD player, providing an option to the user to listen to audio recordings or watch a DVD on the screen 72. An MP3 player may be provided in addition to the CD/DVD player or in lieu thereof.

Of course, the division of the inner chamber of the container 12 into different size compartments 40 and 41 is optional. If desired, the food compartment 40 of the container 12 may 20 be made larger to accommodate more beverages and food items. On the other hand, if the container 12 is designed to accommodate more entertainment devices than food items, the compartment 41 can occupy a larger space in the inner chamber.

The electrical/electronic components of the audio/video portion of the apparatus of the present invention are conventionally provided with control knobs 74, as schematically shown in FIG. 1. A number of other electronic components may be positioned on top of the battery 50, such as a radio 76, a tape player 78, and the like. The radio 76 can be an AM/FM stereo radio, and the cassette tape player can be provided with one or more cassette decks.

Many other changes and modifications can be made in the design of the present invention without departing from the spirit thereof. We, therefore pray that our rights to the present invention be limited only by the scope of the appended claims.

We claim:

1. A recreational storage and multi-media apparatus, comprising:
   a container having upright walls and an interior chamber defined by the upright walls;
   a separating wall dividing the interior chamber into a pair of independent compartments; and
   a lid for covering top of the container, said lid engaging the separating wall to thereby isolate the compartments from each other, and wherein said independent compartments comprise a food compartment and a media compartment.

2. The apparatus of claim 1, further comprising a power source mounted in the media compartment.

3. The apparatus of claim 1, further comprising a compact disc player mounted in the media compartment.

4. The apparatus of claim 1, further comprising an amplifier mounted in the media compartment.

5. The apparatus of claim 1, further comprising a radio mounted in the media compartment.

6. The apparatus of claim 1, further comprising a detachable cover for covering the media compartment, said cover facilitating isolation of the media compartment from items housed in the food compartment.

7. A recreational storage and multi-media apparatus, comprising:
   a container having upright walls and an interior chamber defined by the upright walls;
   a separating wall dividing the interior chamber into a pair of independent compartments; and
   a lid for covering top of the container, said lid engaging the separating wall to thereby isolate the compartments from each other, and further comprising at least one secondary compartment formed by a sleeve suspended on an inner front wall of one of said independent compartments.

8. A recreational storage and multi-media apparatus, comprising:
   a container having upright walls and an interior chamber defined by the upright walls;
   a separating wall dividing the interior chamber into a first and a second independent interior compartments;
   a lid for covering top of the container, said lid engaging the separating wall to thereby isolate the interior compartments from each other;
   a power source positioned in a first interior compartment;
   a plurality of audio devices mounted in said first compartment and operationally connected to said power source; and
   a detachable cover for covering a top of the first compartment.

9. The apparatus of claim 8, wherein said audio devices comprises a compact disc player, a radio and an amplifier.

10. The apparatus of claim 8, further comprising at least one handle pivotally secured on a side wall of the container and a pair rotating wheels attached to a bottom wall of the container.

11. The apparatus of claim 8, further comprising at least one speaker fitted in a front wall of the container.

12. A recreational storage and multi-media apparatus, comprising:
   a container having upright walls and an interior chamber defined by the upright walls;
   a separating wall dividing the interior chamber into interior food compartment and a media compartment;
   a lid for covering top of the container, said lid engaging the separating wall to thereby isolate the interior compartments from each other;
   a power source mounted in the media compartment; and
   a television device fitted in an inner surface of the lid, said television device being powered by said power means.

13. The apparatus of claim 12, further comprising a protective cover positioned over the television device and fitted into the lid to prevent penetration of moisture into said television device.

14. The apparatus of claim 11, further comprising a compact disc player, a digital video device, a radio and an amplifier mounted in said media compartment.

15. The apparatus of claim 11, wherein said upright walls comprise a front wall, and wherein at least one speaker is mounted in said front wall, said at least one speaker being operationally connected to media devices positioned in the media compartment.

16. A recreational storage and multi-media apparatus, comprising:
- a container having upright walls and an interior chamber defined by the upright walls;
- a separating wall dividing the interior chamber into a food compartment and a media compartment;
- a lid for covering top of the container, said lid engaging the separating wall to thereby isolate the food compartment from the media compartments;
- a power source mounted in the media compartment;
- a plurality of audio and video devices mounted in said media compartment and operationally connected to said power source;
- a television device fitted in an inner surface of the lid, said television device being powered by said power means; and
- a cover fitted in said lid for covering said television device and protecting the television device from moisture and contact with food items positioned in the food compartment.

17. The apparatus of claim 16, wherein said audio and video devices comprise a compact disc/digital video device, radio, tape player and an amplifier.

18. The apparatus of claim 16, further comprising at least one speaker fitted in a front wall of the container.

19. The apparatus of claim 8, further comprising at least one handle pivotally secured on a side wall of the container.

* * * * *